United States Patent
McKinney

(10) Patent No.: US 12,245,552 B2
(45) Date of Patent: Mar. 11, 2025

(54) ADJUSTABLE REEL ARM

(71) Applicant: CNH Industrial America LLC, New Holland, PA (US)

(72) Inventor: Preston L. McKinney, Rebersburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 641 days.

(21) Appl. No.: 17/618,246

(22) PCT Filed: Jun. 12, 2020

(86) PCT No.: PCT/US2020/037449
§ 371 (c)(1),
(2) Date: Dec. 10, 2021

(87) PCT Pub. No.: WO2020/252274
PCT Pub. Date: Dec. 17, 2020

(65) Prior Publication Data
US 2022/0217910 A1   Jul. 14, 2022

Related U.S. Application Data

(60) Provisional application No. 62/860,626, filed on Jun. 12, 2019.

(51) Int. Cl.
*A01D 57/04* (2006.01)
*A01D 41/14* (2006.01)

(52) U.S. Cl.
CPC ........... *A01D 57/04* (2013.01); *A01D 41/141* (2013.01)

(58) Field of Classification Search
CPC ........ A01D 57/00; A01D 57/01; A01D 57/02; A01D 57/03; A01D 57/04; A01D 57/06;
(Continued)

(56) References Cited

U.S. PATENT DOCUMENTS

| 4,502,269 A | 3/1985 | Cartner |
| 4,887,417 A | 12/1989 | Parsons, Jr. |

(Continued)

FOREIGN PATENT DOCUMENTS

| EP | 2055173 A1 | 5/2009 |
| EP | 3437455 A1 | 2/2019 |

(Continued)

OTHER PUBLICATIONS

International Search Report and Written Opinion for PCT Application No. PCT/US2020/037449 dated Nov. 25, 2020 (21 pages).

*Primary Examiner* — Thomas B Will
*Assistant Examiner* — Robert E Pezzuto
(74) *Attorney, Agent, or Firm* — Peter K. Zacharias; Rebecca L. Henkel; Rickard K. DeMille

(57) ABSTRACT

A reel assembly of a header for an agricultural vehicle. The reel assembly includes a pair of reel arms each comprising a first member and a second member pivotally connected to the first member, a reel movably connected to and positioned in between the second members of the reel arms, and a pair of actuators. Each actuator is operably connected in between the first member and the second member of a respective reel arm, the actuators are configured for pivoting the second members relative to the first members such that the reel is pivotable relative to the first members of the reel arms.

17 Claims, 5 Drawing Sheets

(58) Field of Classification Search
CPC .... A01D 57/20; A01D 41/127; A01D 41/141;
A01D 75/00; A01D 75/18; A01D 75/182
See application file for complete search history.

(56) References Cited

U.S. PATENT DOCUMENTS

| | | | |
|---|---|---|---|
| 5,005,343 A * | 4/1991 | Patterson | ............... A01D 57/20 |
| | | | 56/14.4 |
| 7,730,707 B2 | 6/2010 | Pietricola et al. | |
| 10,617,059 B2 * | 4/2020 | Dunn | ................... A01D 41/141 |
| 11,849,675 B2 * | 12/2023 | Lyons | .................... A01D 61/02 |

FOREIGN PATENT DOCUMENTS

| | | |
|---|---|---|
| GB | 1221892 A | 2/1971 |
| JP | 2013-128466 A | 7/2013 |
| JP | 2018-88858 A | 6/2018 |

* cited by examiner

ADJUSTABLE REEL ARM

BACKGROUND OF THE INVENTION

The present invention pertains to headers for agricultural vehicles and, more specifically, to reel arms for headers.

An agricultural harvester known as a "combine" is historically termed such because it combines multiple harvesting functions with a single harvesting unit, such as picking, threshing, separating, and cleaning. A combine includes a header which removes the crop from a field and a feeder housing which transports the crop material into a threshing rotor. The threshing rotor rotates within a perforated housing, which may be in the form of adjustable concaves, and performs a threshing operation on the crop to remove the grain. The threshing rotor is provided with rasp bars that interact with the crop material in order to further separate the grain from the crop material, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A typical header generally includes a frame, a pair of end dividers at the lateral ends of the frame, a floor, a cutter to remove crop material from the field, and a conveyor to transport the cut crop material to the feeder housing for further downstream processing in the combine. Generally, the components of a header are specifically optimized to harvest a particular kind of crop. For instance, the header may be in the form of a draper header which is typically used to harvest fluffy or bushy crop such as soy beans or canola. A draper header generally includes a rotating reel assembly with tines, a cutter bar, and a conveyor in the form of one or more draper belts and/or augers. Some draper headers may also move, e.g. lower, raise, roll, pitch, and/or flex, to accommodate the undulating terrain of the field. For instance, a flexing draper header equipped with a flexible cutter bar may raise or lower the cutter bar at various points along the length of the cutter bar to harvest crop which otherwise would have been left on the field.

The rotating reel assembly of a draper header may be composed of a pair of arms, a reel that is rotatable by a motor, a pair of hydraulic cylinders respectively attached to the arms to set the height of the reel relative to the cutter bar, transverse tine bars, and multiple fingers, e.g. tines, movably attached to the tine bars for gathering the crop into the header. Generally, in harvesting a crop, an operator will set the height of the rotor so that the tines are as low to the cutter bar as possible without contacting the cutter bar and/or the ground. However, the resulting height of the reel may be too high to engage and inwardly convey down crop. In this regard, the spatial relationship between the reel and cutter bar may impede the ability of the reel to gather down crop. Furthermore, the ability of the reel to gather down crop may be especially hindered in regard to flexible draper headers. For example, to aggressively harvest down crop when operating a flexible draper header in a flex mode, the operator must generally set the floating height of the header too low to achieve a desired reel height for gathering down crop, which thereby limits the movable range of the flexible cutter bar. Thereby, the position of the reel relative to the cutter bar may limit the mobility of a flexible draper header and/or cause crop yield loss.

What is needed in the art is an improved reel assembly of a header for gathering down crop material.

SUMMARY OF THE INVENTION

In one exemplary embodiment formed in accordance with the present invention, there is provided a reel assembly with pivotable, two-member reel arms, a reel attached to the reel arms, and pivot actuators associated with each reel arm. The reel can be moved by the pivot actuators so that the reel can be lowered and positioned closer to and in front of the cutter bar for more aggressively picking up down crop without interfering with the movement of the cutter bar.

In another exemplary embodiment formed in accordance with the present invention, there is provided a reel assembly of a header for an agricultural vehicle. The header includes a frame and a cutter bar. The reel assembly includes a pair of reel arms each comprising a first member configured for pivotally connecting to the frame of the header and a second member pivotally connected to the first member. The reel assembly also includes a reel movably connected to and positioned in between the second members of the reel arms and a pair of actuators. Each actuator is operably connected in between the first member and the second member of a respective reel arm. The actuators are configured for pivoting the second members relative to the first members such that the reel is pivotable relative to the first members of the reel arms.

In yet another exemplary embodiment formed in accordance with the present invention, there is provided a header for an agricultural vehicle that includes a frame, a cutter bar connected to the frame, and a reel assembly. The reel assembly includes a pair of reel arms each comprising a first member pivotally connected to the frame of the header and a second member pivotally connected to the first member. The reel assembly also includes a reel movably connected to and positioned in between the second members of the reel arms and a pair of actuators. Each actuator is operably connected in between the first member and the second member of a respective reel arm. The actuators are configured for pivoting the second members relative to the first members such that the reel is pivotable relative to the first members of the reel arms.

In yet another exemplary embodiment formed in accordance with the present invention, there is provided a method for harvesting a crop material. The method includes an initial step of providing a header for an agricultural vehicle. The header includes a frame, a cutter bar connected to the frame, and a reel assembly supported by the frame. The reel assembly includes a pair of reel arms each comprising a first member pivotally connected to the frame of the header and a second member pivotally connected to the first member, a reel movably connected to and positioned in between the second members of the reel arms, the reel comprising tines, and a pair of actuators. Each actuator is operably connected in between the first member and the second member of a respective reel arm. The method also includes the steps of pivoting the second members, by the actuators, relative to the first members for positioning the reel at least partially in front of the cutter bar of the header so that the tines extend below and in front of the cutter bar of the header for gathering a down crop, and pivoting the second members, by the actuators, relative to the first members for positioning the reel behind the cutter bar of the header.

One possible advantage of the exemplary embodiment of the header is that the reel assembly positions the reel in front of the cutter bar such that the reel may gather down crop without limiting the operation of the cutter bar and/or movement of the header.

Another possible advantage of the exemplary embodiment of the header is that the reel assembly may change the angle of the reel arms to aggressively pick up down crop material to increase crop yield.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
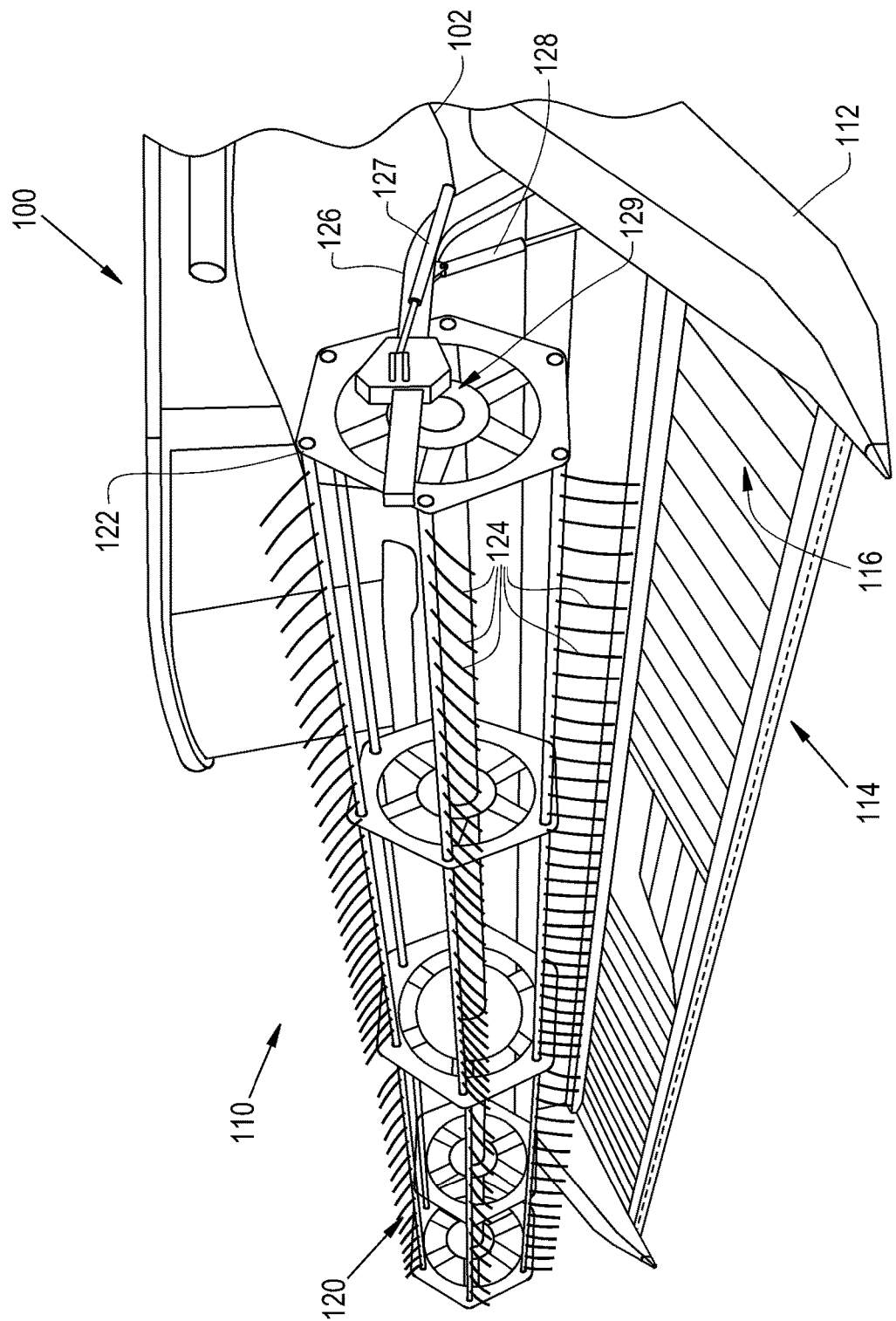
FIG. 1 illustrates a conventional agricultural vehicle with a known draper header.

Referring now to the drawings, and more particularly to FIG. 1, there is shown a known agricultural vehicle 100. The agricultural vehicle 100 is illustrated as a combine 100, which generally includes a chassis 102 supported by wheels, a prime mover, a cab, a feeder housing, and a header 110.

The header 110 is removably attached to the feeder housing. The header 110 is in the form of a draper header 110. The draper header 110 generally includes a frame 112 with left and right lateral ends, a cutter bar 114 that severs the crop from a field, at least one conveyor 116, for example a draper belt 116 and/or auger, which feeds the severed crop inwardly from each lateral end of the frame 112 toward the feeder housing, and a reel assembly 120 mounted to the frame 112, which feeds the crop into the header 110.

The reel assembly 120 generally includes a rotating reel 122 with fingers, e.g. tines 124, a pair of "L"-shaped reel arms 126 mounting the reel 122 to the frame 112, a pair of extension hydraulic cylinders 127, a respective pair of lifting hydraulic cylinders 128, and a reel bearing 129. The reel assembly 120 may also include a reel drive mechanism for rotating the reel. Thereby, the reel 122 may be raised and lowered by the actuators 128 or extended and retracted by the actuators 127. Each reel arm 126 has a proximal, i.e., rear, end and a distal, i.e., front, end. The proximal end of each reel arm 126 is pivotally connected to the frame 112. The reel 122 is movably mounted onto each distal end of the reel arms 126 by way of the reel bearing 129. Each reel arm 126 is a rigid, uniform part that is typically composed of metal.

Figure 2:
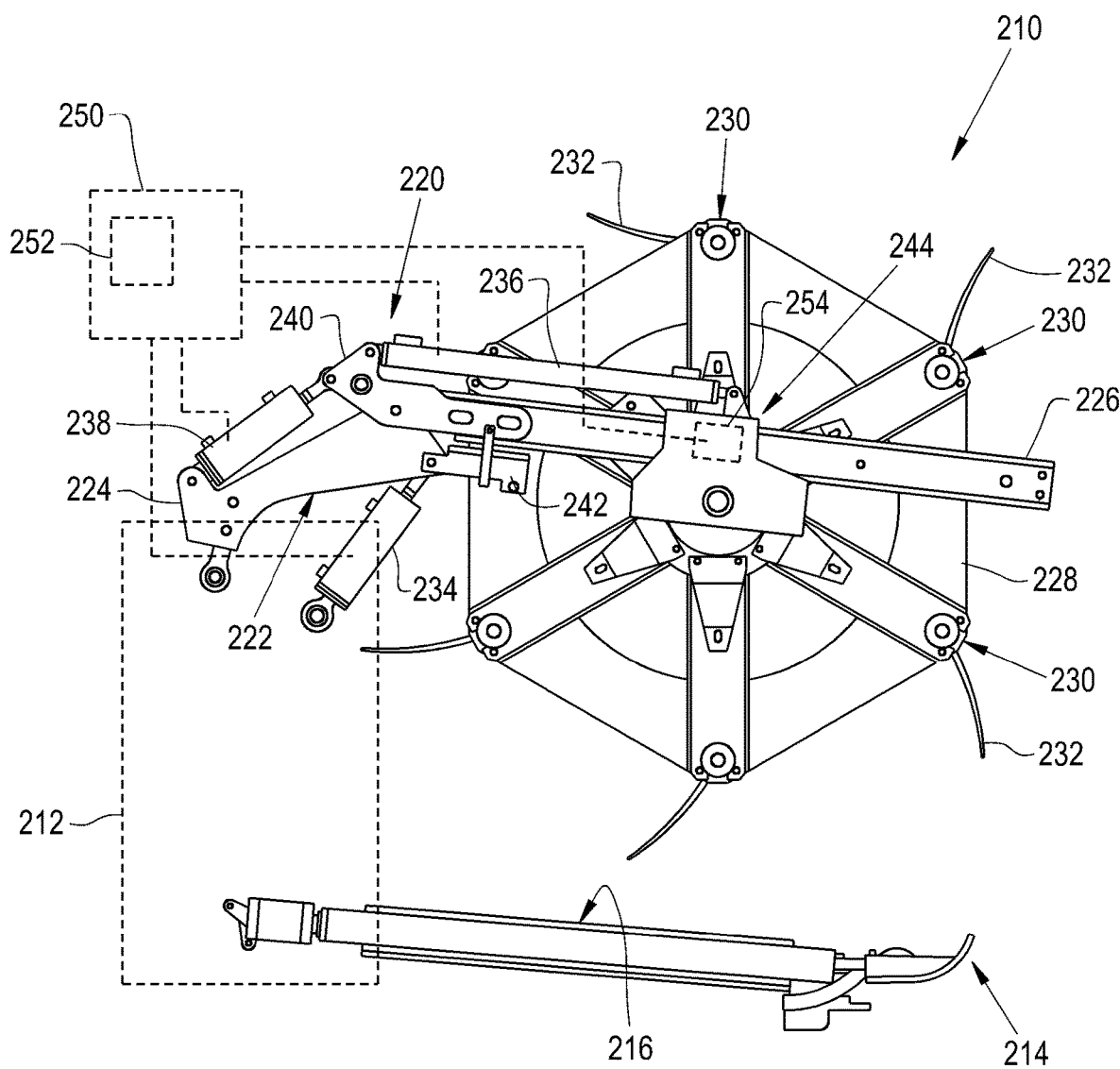
FIG. 2 illustrates a side view of an exemplary embodiment of a reel assembly, the reel assembly including a reel and two-member reel arms, the reel is in a raised position, in accordance with an exemplary embodiment of the present invention.
Figure 3:
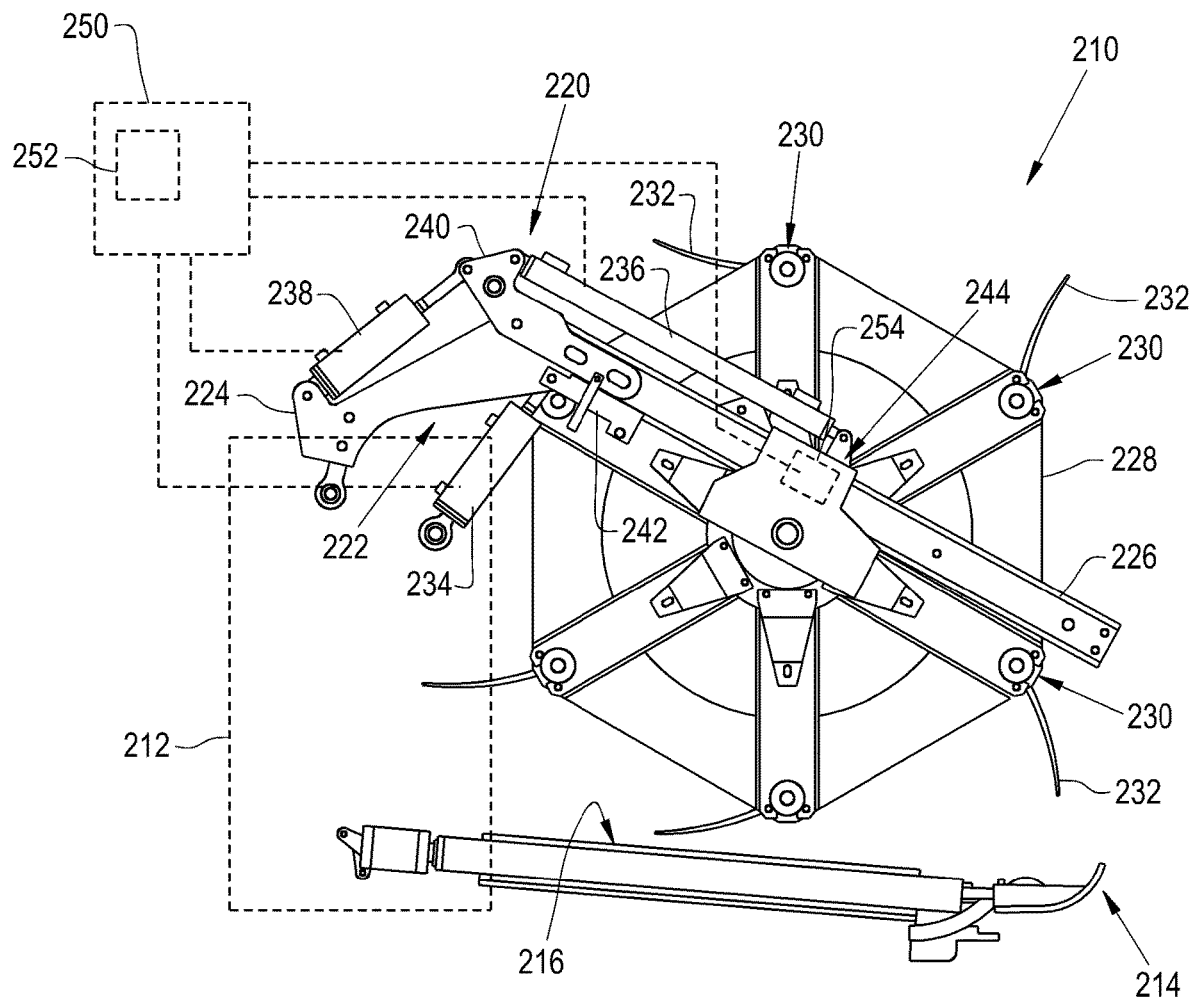
FIG. 3 illustrates a side view of the reel assembly in which the reel is in a lowered position.
Figure 4:
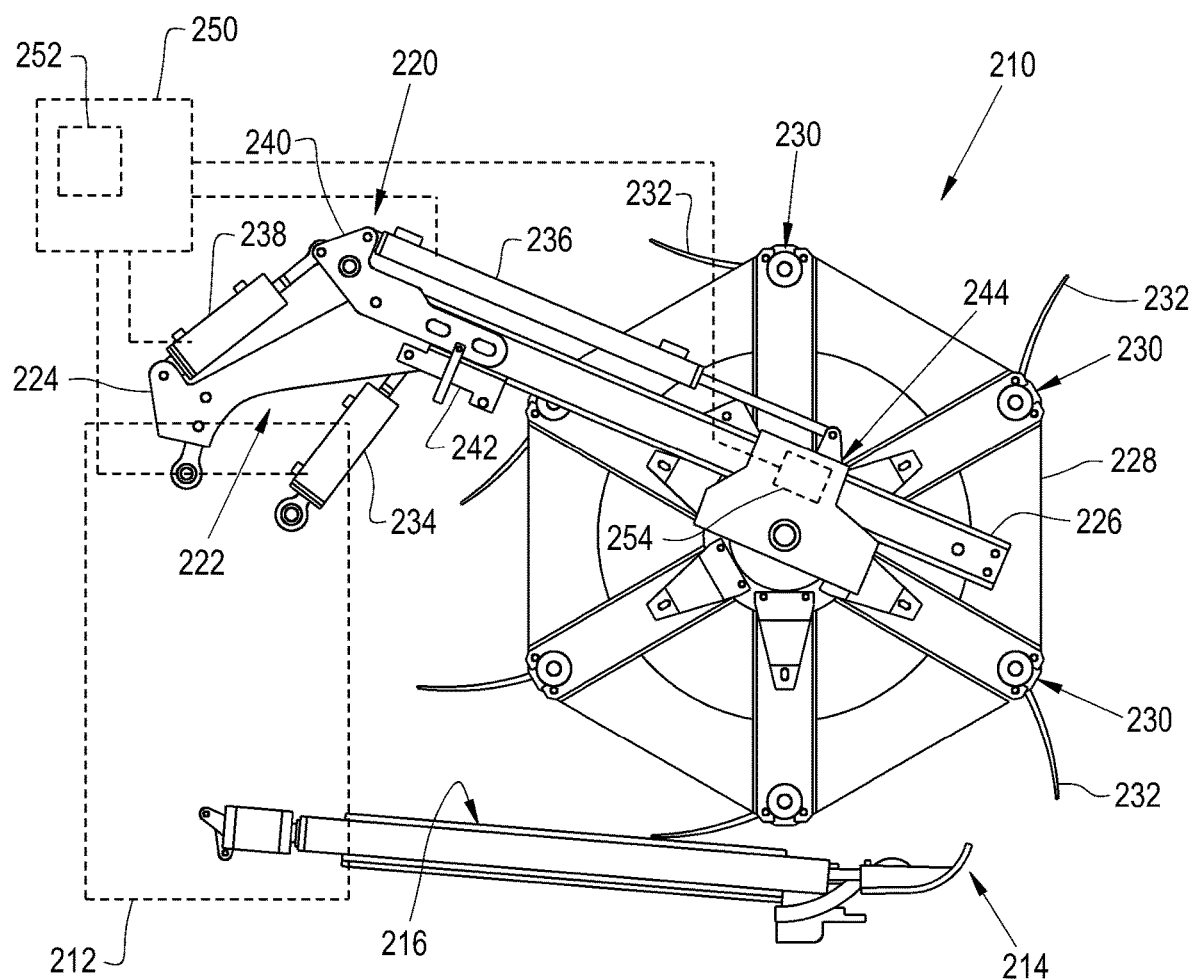
FIG. 4 illustrates a side view of the reel assembly in which the reel is in another lowered position.

Referring now to FIGS. 2-4, there is shown an exemplary embodiment of a header 210 which generally includes a frame 212, a cutter bar 214, at least one conveyor 216, and a reel assembly 220 according to the present invention. The header 210 may be connected to any desired agricultural vehicle, such as a windrower or combine 100, as discussed above. The header 210 may be in the form of any desired header, such as a draper header 210. The draper header 210 may be a flex-draper header 210 which allows the floor and/or cutter bar 214 to flex, or otherwise move, to accommodate the undulations of the field.

The reel assembly 220 may generally include two multi-member reel arms 222 which each include a first and second member 224, 226, a reel 228 with tine bars 230 and tines 232 attached thereto, lift actuators 234, extension actuators 236, and pivot actuators 238. The reel assembly 220 may also include at least one bracket 240, 242 associated with each reel arm 222. The pivot actuators 238 may be retracted to position the reel 228 in a raised position (FIG. 2) or extended to position the reel 228 in one or more lowered positions (FIGS. 3-4). For example, the pivot actuators 238 can be extended to position the reel 228 closer to and behind the cutter bar (FIG. 3) or in front of the cutter bar 214 such that at least a portion of the reel 228 is positioned in front of the cutter bar 214, which thereby enables the reel 228 to more aggressively pickup down crop without interfering with the operation of the cutter bar 214 (FIG. 4). It should be appreciated that although only the right side of the reel assembly 220 of the header 210 is shown the left side of the reel assembly 220 is exactly the same except that it is mirrored. It should be appreciated that the reel assembly 220 may be incorporated into any desired header 210.

Each first member 224 of a respective reel arm 222 is pivotally connected to the frame 212, and each second member 226 is pivotally connected to each first member 224 by way of the at least one bracket 240, 242. Each first member 224 may be in the form of a beam or plate with an irregular polygonal cross-section. For instance, each first member 224 may have one or more protrusions or angled end sections for mounting the respective pivot actuator 238, lift actuator 234, and/or bracket(s) 240, 242. Each second member 226 may be in the form of a rectangular or cylindrical beam. Each It should be appreciated that each second member 226 can be directly pivotally connected to each first member 224 without incorporating a bracket. Each second member 226 can be pivotally connected to each first member 224 by two brackets 240, 242. The first bracket 240 can be pivotally connected to the upper portion of a respective first member 224 at a middle section of the first bracket 240 and to a respective second member 226 at an end portion of the first bracket 240. The second bracket 242 can be pivotally connected to the lower portion of the respective first member 224 and to the first bracket 240 and/or respective second member 226 by one or more links (unnumbered). Thus, each bracket 240, 242 defines a respective pivot location of each second member 226. The second bracket 242 may also function as a mechanical stop to thereby limit the pivotable range of each second member 226 relative to each first member 224.

The reel 228 is positioned in between and movably connected, via a reel bearing 244, to the second members 226 of the reel arms 222. The reel 228 can be extended inwardly or outwardly, via the extension actuators 236, and raised or lowered, via the lift and/or pivot actuators 243, 238. The reel 228 may be lowered such that at least a portion of the reel 228 extends beyond the cutter bar 214 for picking up down crop. In this regard, at least a portion of the tines 232 and/or the tine bars 230 may extend past, i.e. in front of, the cutter bar 214 (FIG. 4).

Each lift actuator 234 may be connected in between the frame 212 and the respective first member 224. The lift actuators 234 are configured for adjusting a vertical position of the reel 228. Each extension 236 actuator is operably connected to the respective second member 226. In other words, each extension actuator 236 is connected in between a respective bracket 240 and reel bearing 244. The extension actuators 236 are configured for adjusting a horizontal position of the reel 228 relative to each second member 226. Each pivot actuator 238 is operably connected in between the respective first member 224 and second member 226. The first end of each pivot actuator 238 is connected to a respective first member 224 and the second end of each pivot actuator 238 is connected to a respective at least one bracket 240 and/or second member 226. Each pivot actuator may be positioned on top of each first member 226. The pivot actuators 238 are configured for pivoting the second members 226 relative to the first members 224 such that the reel 228 is pivotable relative to the first members 224. The actuators 234, 236, 238 may be in the form of any desired actuators, such as hydraulic or electric cylinders.

In another exemplary embodiment, the header 210 or reel assembly 220 may further include an electronic control unit (ECU) 250, with a memory 252, and at least one sensor 254. Thereby, the motion and/or float mode of the reel 228 may be automatically controlled by the ECU 250.

The ECU 250 is operably connected to the actuators 234, 236, 238 and sensor(s) 254. The ECU 250 may automatically control the actuation of the actuators 234, 236, 238. The ECU 250 may prevent an actuation of the pivot actuators 238 unless the position signal of the position sensor 254 registers that the reel 228 is at least partially in front of the cutter bar 214. Additionally, under normal flex mode conditions of the header 210, the pivot actuators 238 would be retracted to keep the reel 228 lifted so that the tines 232 would not contact the ground (FIG. 2). If reel 228 is in a lowered position (FIG. 4), and the operator tries to then move the reel 228 back towards the cutter bar 214, the ECU 250 would automatically retract the pivot actuators 238 to raise the reel 228 up so that the reel 228 does not interfere with the cutter bar 214. Also, the reel assembly 220 allows the cutter bar 214 to be locked in a mid-float position when cutting in a rigid mode because so long as the header 210 remained in the rigid mode, the pivot actuators 238 could be unlocked and actuated by the ECU 250 to thereby keep the reel 228 at a desirable distance from the cutter bar 214. Furthermore, if the header 210 senses that the cutter bar 214 is cutting on the ground in a rigid mode, the ECU 250 may automatically actuate the pivot actuators 238 to prevent contact between the reel 228 and the cutter bar 214. In this regard, the reel assembly 220 may allow the operator to run a rigid header 210 which easily and efficiently functions as a flex header 210 with a limited range. The ECU 250 may be in the form of any desired analog or digital control unit. For example, the ECU 250 may be in the form of a controller. The ECU 250 may be incorporated into existing hardware and/or software of the agricultural vehicle 100 or header 210.

The position sensor(s) 254 may be connected to the reel 228 and operably connected to the electronic control unit 250. Each position sensor 254 is configured for sending a respective position signal, indicating the position of the reel 228, to the ECU 250. The position sensor 254 may be in the form of any desired sensor, such as an optical sensor, linear position sensor, GPS sensor, etc. It should be appreciated that the header 210 may include more than one position sensor. For example, the header 210 may include three or more sensors, in the form of linear sensors, that are incorporated into respective actuators 234, 236, 238.

Figure 5:
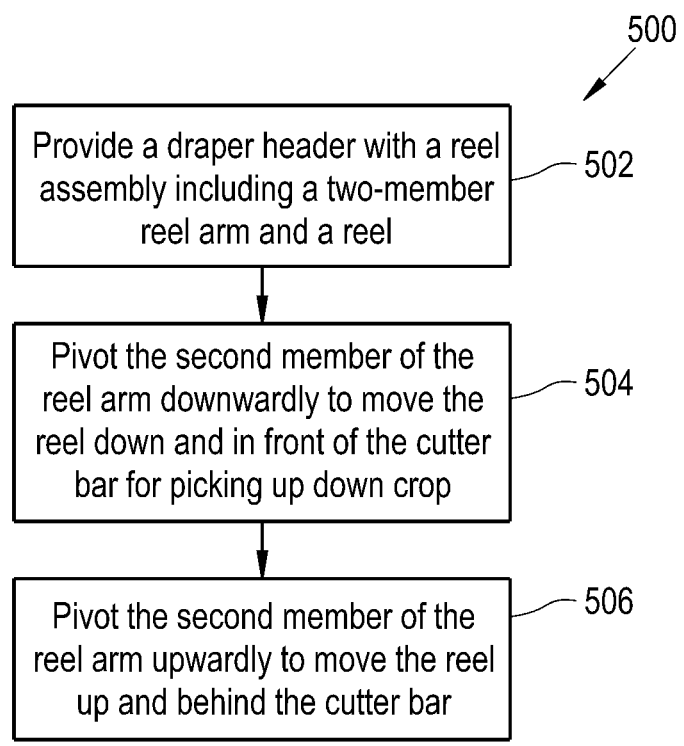
FIG. 5 illustrates a flow-diagram of a method for harvesting a crop material with the reel assembly of FIGS. 2-4.

Referring now to FIG. 5, there is shown a method 500 for harvesting a crop material with a draper header 210. The method 500 may include an initial step of providing the reel assembly 220, as discussed above (at block 502). For simplicity of description, the method 500 will be discussed with respect to a single reel arm 222; however, it should be appreciated that the method 500 applies to both reel arms 222 on each lateral end of the reel 228. The method 500 may include the step of pivoting the second member 226 of the reel arm 222 downwardly, by extending the pivot actuator 238 and/or extension actuator 236, in order to move the reel 228 down and in front of the cutter bar 214 for picking up down crop (at block 504). The method 500 may also include the step of pivoting the second member 226 of the reel arm 222 upwardly, by retracting the pivot actuator 238, in order to move the reel 228 up and behind the cutter bar 214 (at block 506). The method 500 may also include the step of pivoting the second member 236 downwardly, by extending the pivot actuator 238, in order to lower the reel 228 in any desired position such as positioning the reel 228 closer to the cutter bar 214 yet keeping the reel 228 behind the cutter bar 214.

It is to be understood that the steps of the method 500 are performed by the ECU 250 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the ECU 250 described herein, such as the method 500, is implemented in software code or instructions which are tangibly stored on a tangible computer readable medium. The ECU 250 loads the software code or instructions via a direct interface with the computer readable medium or via a wired and/or wireless network. Upon loading and executing such software code or instructions by the ECU 250, the ECU 250 may perform any of the functionality of the ECU 250 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A reel assembly of a header for an agricultural vehicle, the header comprising a frame and a cutter bar, the reel assembly comprising:
   a pair of reel arms each comprising a first member configured for pivotally connecting to the frame of the header and a second member pivotally connected to the first member;
   a reel movably connected to and positioned in between the second members of the reel arms;
   a pair of pivot actuators, and each of the pivot actuators is operably connected in between the first member and the second member of a respective one of said reel arms, the pivot actuators are configured for pivoting the second members relative to the first members such that the reel is pivotable relative to the first members of the reel arms; and
   an electronic control unit and at least one sensor connected to the reel and operably connected to the electronic control unit, the at least one sensor is configured for sensing a position of the reel and sending a corresponding position signal to the electronic control unit.

2. The reel assembly of claim 1, wherein the reel comprises tines, and the pair of pivot actuators are configured for positioning the reel so that the tines extend below and in front of the cutter bar of the header for gathering a down crop without inhibiting a movement of the cutter bar.

3. The reel assembly of claim 1, wherein each of the pivot actuators is positioned on top of a respective one of said first members.

4. The reel assembly of claim 1, wherein the electronic control unit prevents an actuation of the pivot actuators unless the position signal of the at least one sensor registers that the reel is at least partially in front of the cutter bar of the header.

5. The reel assembly of claim 1, further comprising a pair of lift actuators which are each configured for connecting in between the frame of the header and the first member of each of the reel arms, the lift actuators are configured for adjusting a vertical position of the reel, and a pair of extension actuators which are each operably connected to the second member of each of the reel arms, and the extension actuators are configured for adjusting a horizontal position of the reel relative to each of the second members of each of the reel arms.

6. A reel assembly of a header for an agricultural vehicle, the header comprising a frame and a cutter bar, the reel assembly comprising:
   a pair of reel arms each comprising a first member configured for pivotally connecting to the frame of the header and a second member pivotally connected to the first member;
   a reel movably connected to and positioned in between the second members of the reel arms;
   a pair of pivot actuators, and each of the pivot actuators is operably connected in between the first member and the second member of a respective one of said reel arms, the pivot actuators are configured for pivoting the second members relative to the first members such that the reel is pivotable relative to the first members of the reel arms; and
   wherein the reel assembly further comprises either:
   (i) brackets, wherein each of the brackets is associated with a respective one of the reel arms, and wherein each of the second members is pivotally connected to a respective one of the first members by one of the brackets, or
   (ii) a pair of lift actuators which are each configured for connecting in between the frame of the header and the first member of each of the reel arms, the lift actuators are configured for adjusting a vertical position of the reel, and a pair of extension actuators which are each operably connected to the second member of each of the reel arms, and the extension actuators are configured for adjusting a horizontal position of the reel relative to each of the second members of each of the reel arms.

7. The reel assembly of claim 6, wherein each of the pivot actuators comprises a first end and a second end, and the first end of each of the pivot actuators is connected to a respective one of said first members, and the second end of each of the pivot actuators is connected to a respective one of said brackets.

8. The reel assembly of claim 7, further comprising two of said brackets associated with each of the reel arms for pivotally connecting a respective one of the second members to a respective one of the first at a respective pivot location.

9. A header for an agricultural vehicle, comprising:
   a frame;
   a cutter bar connected to the frame; and
   the reel assembly of claim 1.

10. The header of claim 9, wherein the reel assembly further comprises a pair of lift actuators which are each connected in between the frame of the header and the first member of each of the reel arms, the lift actuators are configured for adjusting a vertical position of the reel, and a pair of extension actuators which are each operably connected to the second member of each of the reel arms, and the extension actuators are configured for adjusting a horizontal position of the reel relative to each of the second members of each of the reel arms.

11. The header of claim 9, wherein the reel comprises tines, and the pair of pivot actuators are configured for positioning the reel so that the tines extend below and in front of the cutter bar of the header for gathering a down crop without inhibiting a movement of the cutter bar.

12. The header of claim 9, wherein the reel assembly further comprises brackets, wherein each of the brackets is associated with a respective one of the reel arms, and wherein each of the second members is pivotally connected to a respective one of the first members by one of the brackets.

13. The header of claim 12, wherein each of the pivot actuators comprises a first end and a second end, and the first end of each of the pivot actuators is connected to a respective one of said first members and the second end of each of the pivot actuators is connected to a respective one of said brackets.

14. The header of claim 12, further comprising two of said brackets associated with each of the reel arms for pivotally connecting a respective one of the second members to a respective one of the first members at a respective pivot location.

15. The header of claim 9, wherein each of the pivot actuators is positioned on top of a respective one of said first members.

16. The header of claim 9, wherein the electronic control unit prevents an actuation of the pivot actuators unless the position signal of the at least one sensor registers that the reel is at least partially in front of the cutter bar of the header.

17. A method for harvesting a crop material by a header for an agricultural vehicle, the header comprising a frame, a cutter bar connected to the frame, and a reel assembly supported by the frame, the reel assembly comprising a pair of reel arms each comprising a first member pivotally connected to the frame of the header and a second member pivotally connected to the first member, a reel movably connected to and positioned in between the second members of the reel arms, the reel comprising tines, and a pair of actuators and each of the actuators is operably connected in between the first member and the second member of a respective one of said reel arms, the method comprising:
- pivoting the second members, by the actuators, relative to the first members for positioning the reel at least partially in front of the cutter bar of the header so that the tines extend below and in front of the cutter bar of the header for gathering a down crop;
- pivoting the second members, by the actuators, relative to the first members for positioning the reel behind the cutter bar of the header;
- an electronic control unit and at least one sensor connected to the reel and operably connected to the electronic control unit, and the at least one sensor is configured for sensing a position of the reel and sending a corresponding position signal to the electronic control unit.

* * * * *